United States Patent [19]
Ethridge

[11] 3,994,056
[45] Nov. 30, 1976

[54] APPARATUS FOR FLUID TREATMENT OF YARN

[75] Inventor: Fredrick A. Ethridge, Charlotte, N.C.

[73] Assignee: Fiber Industries, Inc., Charlotte, N.C.

[22] Filed: July 10, 1974

[21] Appl. No.: 487,343

Related U.S. Application Data

[60] Division of Ser. No. 354,045, April 24, 1973, Pat. No. 3,849,846, which is a continuation-in-part of Ser. No. 152,307, June 11, 1971, abandoned.

[52] U.S. Cl. .............................. 29/157 C; 239/545; 28/1.4; 57/34 B
[51] Int. Cl.² ..................... B23P 15/00; B23P 9/00; D02G 1/16
[58] Field of Search ............ 29/157 C; 239/545, 600; 28/1.4, 72.12; 137/815; 57/34 B; 34/23, 24

[56] References Cited
UNITED STATES PATENTS

| | | | |
|---|---|---|---|
| 3,286,321 | 11/1966 | Fletcher et al. | 28/72.12 |
| 3,423,809 | 1/1969 | Schmitt | 28/72.12 |
| 3,426,781 | 2/1969 | Neuman | 137/815 |
| 3,525,134 | 8/1970 | Coon | 28/1.4 |
| 3,604,442 | 9/1971 | Tucker | 137/808 |
| 3,608,573 | 9/1971 | Bahrton | 137/839 |
| 3,638,291 | 2/1972 | Yngve | 28/1.4 |
| 3,659,350 | 5/1972 | McCullough | 28/1.4 |
| 3,727,274 | 4/1973 | White | 28/72.12 |

FOREIGN PATENTS OR APPLICATIONS

| | | | |
|---|---|---|---|
| 1,001,544 | 8/1965 | United Kingdom | 137/815 |

*Primary Examiner*—Milton S. Mehr
*Assistant Examiner*—Dan C. Crane
*Attorney, Agent, or Firm*—Robert J. Blanke

[57] ABSTRACT

A fluid yarn processing jet of trilaminar construction wherein a recessed discontinuous inner lamina forms a yarn processing duct which has at least one fluid entry port thereto and wherein an outer lamina is readily removable to facilitate the placement of yarn within the duct. All exterior edges in the vicinity of the duct which are resultant from the recessing of the inner laminar are rounded so as to prevent yarn damage.

3 Claims, 4 Drawing Figures

APPARATUS FOR FLUID TREATMENT OF YARN

This is a division of application Ser. No. 354,045, filed Apr. 24, 1973, now U.S. Pat. No. 3,849,846, which is a continuation-in-part application of copending application Ser. No. 152,307, filed June 11, 1971, now abandoned, relates to fluid treatment apparatus, and more specifically, to fluid treatment apparatus suitable for processing multifilament yarns.

Yarn producers have long sought efficient methods for processing multifilament yarns so as to either bulk these yarns or find a substitute for twisting operations.

It is well known in the textile industry that continuous filament yarn bundles in their "as spun" or zero twist configurations perform poorly in many of the common textile operations such as winding, weaving, knitting and the like, primarily due to a looseness of structure that permits individual filaments to snap and break, thence forming fluff balls, slubs, ringers, wraps, strip backs or similar defects. Zero twist yarns also have a tendency to run in the form of a ribbon over guides, rollers and so forth, whereby as a result of increased frictional contact, the yarns are more readily abraded and subject to breakage. As a result of these shortcomings, continuous filament producers usually carry out the additional step of twisting each continuous filament yarn bundle to provide an acceptable starting product. The twisting operation serves to compact and unify the yarn bundle, thus resulting in a more cohesive structure which resists the pulling out of individual filaments. The twisting operation, however, is expensive and time consuming and does not lend itself to the continuous operation which characterizes much of the manufacturing sequence in the preparation of the zero twist continuous filament yarn bundle.

It is also well known in the textile industry that a multifilament yarn bundle can be crimped by setting the yarn in a distorted configuration. However, mechanical means commonly employed for achieving the distorted configuration are time consuming and usually have limited processing speeds inasmuch as moving parts or heavy frictional drag are often required.

In order to overcome the expense of the twisting operation, and also to employ a twist substitute manufacturing operation which is adaptable to the continuous filament yarn bundles, compact interlaced yarns have recently been introduced in the textile industry. Compacted interlaced multifilament textile yarns of the type presently under discussion and processes for their preparation are set forth in U.S. Pat. No. 3,286,321. In brief, the compact interlaced multifilament textile yarns of the prior art are produced by subjecting an "as spun" substantially zero twist continuous filament bundle to the action of one or more fluid jets whereby individual filaments in a duct of carefully controlled surface characteristics are randomly intermingled with adjacent filaments and groups of filaments by frictional constraint between the filaments. Yarns of this type have been seen to be satisfactory for such textile operations as winding, beaming, tufting and knitting.

Correspondingly, in order to overcome the expense of mechanical bulking operations, and also in order to achieve new and unexpected aesthetic qualities in bulk continuous filament yarns, the fluid bulked continuous filament yarns have been adapted by the textile industry. Fluid bulked continuous filament yarns of the type presently under discussion are set forth in U.S. Pat. No. 3,380,242. In brief, the fluid bulked continuous filament textile yarns of the prior art are produced by subjecting a continuous filament yarn to a fluid stream jetted rapidly from a confined space to form a turbulent region. Yarn to be treated is fed into the fluid stream so that the yarn is supported by it and the individual filaments are separated from each other and whipped about violently in the turbulent region. The violent action produces convolutions in the yarns that are retained during withdrawal, winding and further processing.

In addition to the intermingling and bulking applications of the fluid treatment apparatus, apparatus of this type may also be used to splice yarn ends and to retard or forward a running length of yarn.

Basically, regardless of the fluid treatment to be conducted on the continuous filament, the apparatus employed usually falls into three categories based on the manner in which the yarn is threaded into the device, these categories being as follows:

1. Bored through designs — A free end of yarn must be threaded through at the stop or aspirated through on the run.

2. Slotted designs — Continuous yarn is threaded through the device either stopped or running via a permanently open slot cut from outside through the jet along the entire length of the interior treatment duct(s) and/or chamber(s).

3. Closable designs — The device is split along its length in some manner such that it may be opened to thread continuous yarn with subsequent closure.

The disadvantage of the bored through designs is obvious in that the yarn must be cut and threaded through what is frequently a relatively small diameter hole at rapid yarn running speeds. Slotted designs, while easier to thread, suffer from the presence of an imbalance in desirable flow patterns, while the closable designs eliminate the deficiencies of the two aforementioned types of apparatus. These designs frequently produce precision difficulties of their own and also frequently result in trapping or snagging of running filaments.

While string-up problems have been solved to a major extent by designs such as that set forth in U.S. Pat. No. 3,525,134 a uniform rectangular bore is difficult to achieve due to problems encountered in machining the sharp interior corners and controlling the surface characteristics of the rectangular bore. Any variations in the bore will, of course, upset the fluid flow pattern or create a pneumatic imbalance and reduce the efficiency of the apparatus. If the tolerances of the corners are very poor, a danger also exists that the yarn will be trapped or snagged.

It is therefore an object of this invention to provide pneumatic continuous filament yarn processing apparatus which is readily threadable, has controlled surface characteristics within the bore, does not create a pneumatic imbalance in the system, and neither traps nor snags running filaments.

It is an additional object of the invention to provide a method for preparing a yarn processing apparatus which neither traps nor snags running filaments and has a uniform rectangular bore free of yarn damaging defects.

In accordance with this invention, it has now been discovered that an improved, readily threadable fluid multifilament yarn processing device may be obtained by using a sandwich or trilaminar structure comprising a yarn treatment duct having at least one fluid entry port thereto, the duct being formed by a discontinuous inner lamina. The inner lamina is recessed and the edges forming a portion of the entrance and exit of the duct are radiused in a manner such as to maintain a quadrilateral cross section. Preferably, all yarn exposed edges of the exterior laminae are also radiused. Thus, in the final assembly, if two intersecting surfaces expose an edge to the yarn, the intersection is radiused. If either of the intersecting surfaces is not exposed to the yarn, the intersection is maintained sharp. The yarn processing duct is quadrilateral and preferably rectangular in cross-section. The fluid entry port or ports may have any cross-section, but are preferably rectangular. In the assembly of the apparatus, slight longitudinal or lateral displacement of the inner members exposes no joints or crevices. The most critical features of the assembly operation are maintaining the sides of the inner members parallel and the outer members flat.

It should be understood that during the manufacture of the individual members comprising the yarn processing device of this invention, there is an unobstructed exposure of all surfaces which subsequently in union will form the walls of the yarn processing duct. Because the surfaces of the members forming the walls of the yarn processing duct may be subjected to finishing operations prior to final assembly, surface finishes on the walls of the yarn processing duct may be obtained which would otherwise be impossible; that is to say, a quadrilateral crosssection yarn processing duct could not be machined into the face of a body member so as to yield the surface finish obtainable by the instant invention. For instance, if so desired, a mirror-like finish may be produced on the walls of the yarn processing duct of the yarn processing device of this invention, the mirror-like finish preferably having a surface roughness value of less than 8 R.M.S. Measurements for the R.M.S. value may be obtained by a Brush surface finish analyzer or may be measured by visual comparison. Such visual comparison may be made with a set of surface finish standard samples such as those made by the University Machine Company of Cambridge, Massachusetts. The improvements obtainable in processing yarn through a duct having a mirror-like finish are well recognized in the art as evidenced by U.S. Pat. No. 3,286,321.

It should also be understood that the apparatus of this invention may be employed to interlace yarn, bulk yarn, splice yarn ends and guide yarn with either a braking or yarn advancing action. The design of the yarn passage and fluid entry ports thereto are determined of course by the desired use of the apparatus. Regardless of the application, however, the yarn passage is rectangular in cross-section while the fluid entry ports or conduits may be either annular or rectangular in crosssection.

A better understanding of the invention may be had from the drawings wherein.

Figure 1:
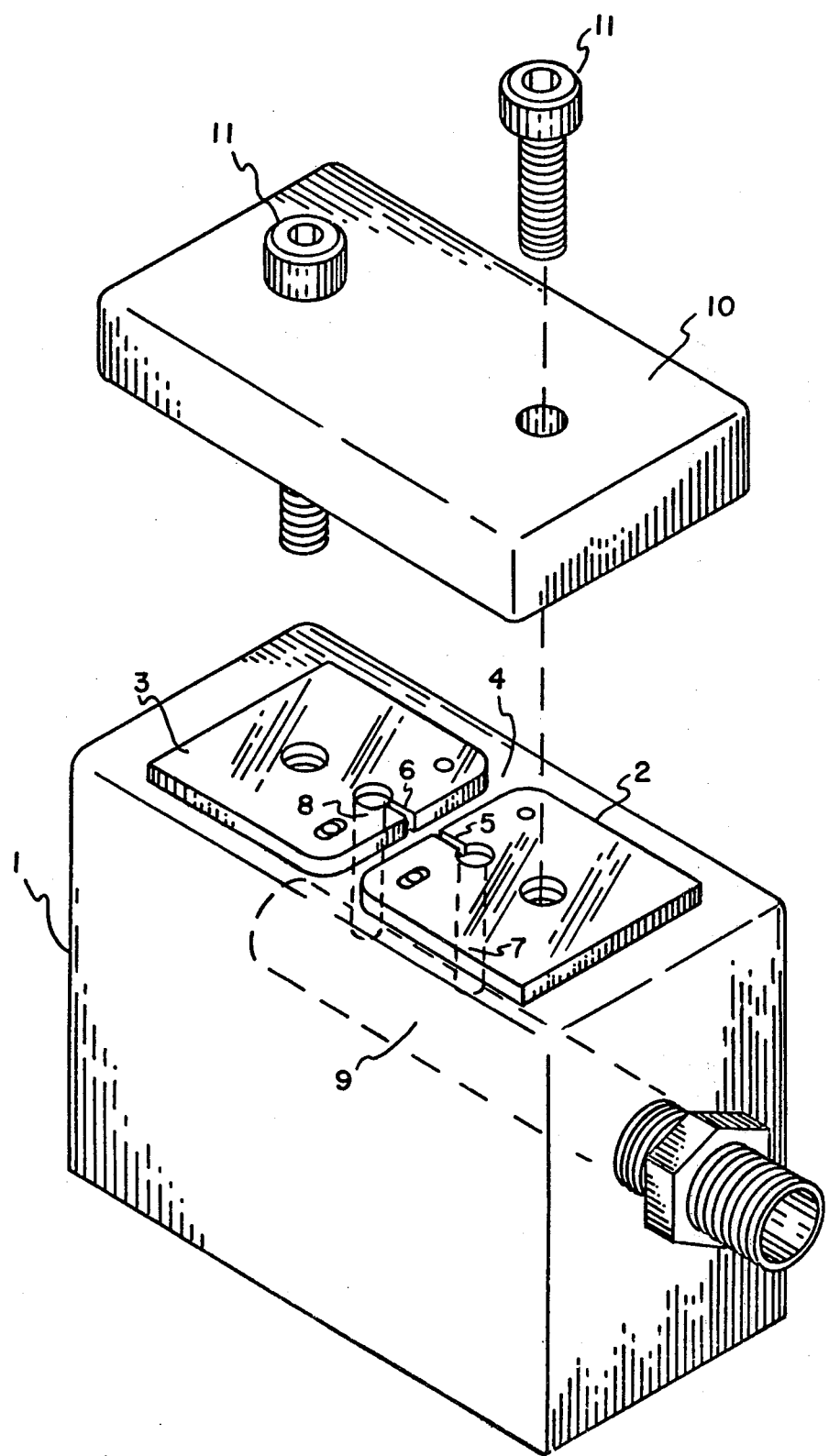
FIG. 1 is a partially exploded projected view of one type of rectangular duct apparatus of this invention.

Turning to FIG. 1, it may be seen that the fluid yarn treating apparatus is composed of a body member 1 having an essentially flat surface. The channel, or yarn processing duct 4 is formed by securing right hand plate member 2 and left hand plate member 3 to body member 1. Plate members 2 and 3 should be set back from the yarn approach edge of body member 1 and plate member 10 such that flat surface is mated to flat surface with no crevice left open to trap filaments. Moreover, by recessing the inner lamina, all exterior edges in the path of the yarn threadline are allowed to be rounded wihout creating yarn trapping areas. Yarn processing duct 4 therefore is perfectly rectangular in cross-section due to the rectangular configuration of plate members 2 and 3. It should be understood that should channel member 4 have been machined into the face of body member 1 that the same tolerances as are obtained in the yarn processing duct or channel by use of plate members 2 and 3 could not be obtained. Fluid inlets 5 and 6 are disposed in plate members 2 and 3 respectively, fluid being fed to these inlets through port members 7 and 8 which are disposed over fluid duct 9 (shown in phantom) disposed within body member 1. Channel cover 10, which is shown in exploded form, is secured to right hand plate member 2, and left hand plate member 3 by means of set screws 11, channel cover 10 completing the three layer sandwich of which each component forms at least one face of the yarn processing duct or channel. The extreme ease with which the apparatus of FIG. 1 may be threaded or strung up may be readily seen in that channel cover member 10 is merely removed, yarn placed in the channel 4, followed by securing channel cover member 10 by means of set screws 11.

Figure 2:
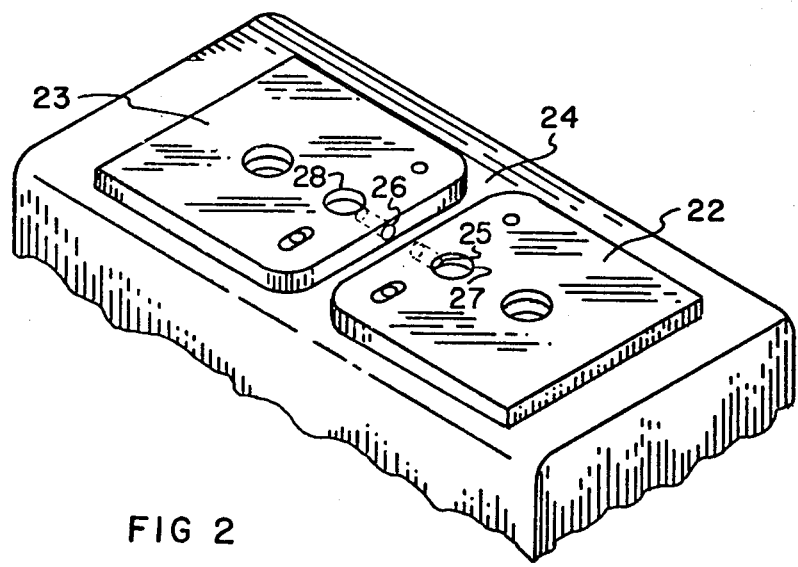
FIG. 2 is a broken view of one type of yarn processing duct of FIG. 1.

If desired, the advantages of the plate formed yarn processing duct of this invention may be retained while employing conventional drilled, circular cross-section air entry ports. This design may be seen in FIG. 2 of the drawings wherein a broken view of the apparatus less the channel cover plate assembly is illustrated. As can be seen, a rectangular yarn processing duct 24 is again formed by securing right hand plate member 22 and left hand plate member 23 to a planar face of body member 1. Fluid entry ports 25 and 26 of plate member 22 and 23, respectively, are circular in cross-section and supplied with fluid port members 27 and 28. It should be understood that the portion of the apparatus of FIG. 2 which has not been illustrated is identical to that shown in FIG. 1.

Figure 3:
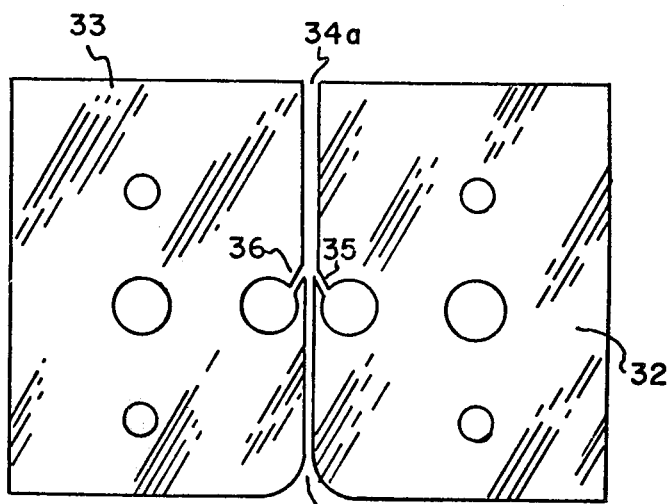
FIG. 3 is a top view of a segment of an alternative form of yarn processing duct.

If desired, the sandwich assembly may be used as a yarn forwarding or yarn braking assembly by employing plate member designs as set forth in FIG. 3. Alternatively, if it is desired to bulk yarns rather than intermingle yarns, the plate design of FIG. 4 of the drawings may be employed.

Turning to FIG. 3 which is a top view of the internal portion of the sandwich structure which forms the apparatus of this invention, it can be seen that the yarn processing duct is not of constant dimension. Right hand segment 32 and left hand segment 33 again form the vertical walls of the yarn processing duct. Fluid entry ports 35 and 36 of segments 32 and 33, respectively, intersect the yarn processing duct at an angle thereby exerting a braking action on yarn entering yarn processing duct portion 34a. To further enhance the braking action, the downstream portion of yarn processing duct 34b has smaller dimensions than the upstream portion 34a.

Figure 4:
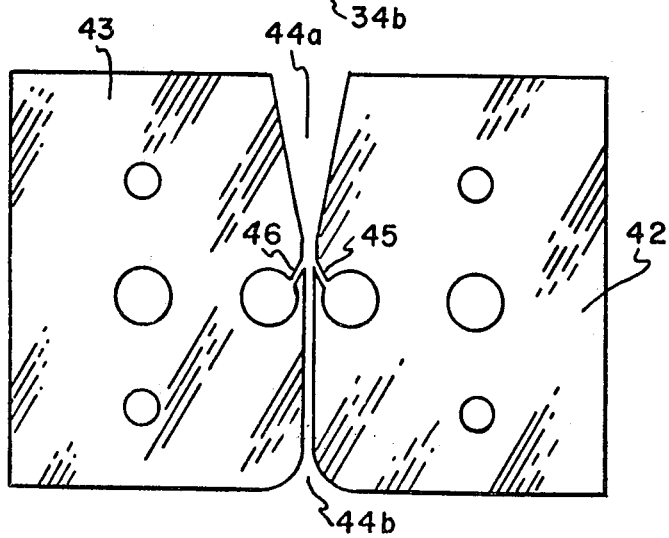
FIG. 4 is a top view of a segment of another alternative form of yarn processing duct.

Should it be desired to formulate a bulking jet from the sandwich assembly of this invention, the internal portion of the sandwich may have a configuration such as is set forth in FIG. 4 of the drawings. In FIG. 4, which is a top view of the internal portion of the sandwich structure of this invention, the varying configuration of the yarn processing duct can be seen. The vertical walls of the yarn processing duct are again formed by a right hand plate member 42 and a left hand plate member 43. Fluid entry ports 45 and 46 of segments 42 and 43, respectively, intersect the yarn processing duct at an angle The downstream portion of the yarn processing duct 44a is flared while the upstream portion of the yarn processing duct 44b has a constant cross-section. The design is such that a high velocity turbulent zone is set up in the downstream segment of the yarn processing duct 44a whereby bulking of the yarn is achieved.

The importance of recessing the inner lamina cannot be stressed enough. If an attempt is made to align the outer edges of the lamina, a sharp yarn damaging corner will invariably be exposed, especially after the repeated disassembly necessary in yarn string-up operations. If the outer edges of the lamina are alligned and the sharp corners radiused or rounded, a yarn trapping or snagging area will be produced. By recessing the inner lamina, however, and radiusing the exterior edges in the path of the yarn threadline, there will be neither yarn damaging sharp edges nor yarn trapping junctures between the radiused edges.

While a plurality of processes may, of course, be run employing the compacting, bulking and yarn guide apparatus previously disclosed, the following specific example is given to illustrate the utility of the apparatus of FIG. 1.

EXAMPLE

Turning to FIG. 1, the cover plate 10 is detached and a 2600 total denier 136 filament nylon yarn is guided through the open duct 4. Channel cover 10 is then secured to the main body of the apparatus by means of screw members 11. The dimensions of the yarn processing duct are 0.5 inches in length not including radiused entry and exit portions and a cross-section which is 0.1 inch square. The air entry ports have a crosssection which is 0.025 by 0.1 inch in cross-section. When air pressures and upstream and downstream tensions are employed as given in the following table, the following hook drop results are obtained, the hook drop measurements being run according to the procedure set forth in U.S. Pat. No. 2,985,995:

TABLE

| Air Pressure p.s.i.g. | Jet Tension Upstream Grams Per Filament Bundle | Jet Tension Downstream Grams Per Filament Bundle | Hook Drop |
| --- | --- | --- | --- |
| 40 | 35 | 45–50 | 6.1 |
| 50 | 35 | 50 | 5.3 |
| 60 | 40 | 50 | 3.8 |
| 70 | 35 | 50 | 2.8 |
| 50 | 25 | 40 | 13.5 |
| 50 | 45 | 50 | 5.0 |
| 50 | 60 | 65 | 5.1 |
| 50 | 90 | 95 | 6.1 |
| 40 | 45 | 60–65 | 5.5 |
| 50 | 50 | 65 | 5.5 |
| 60 | 50 | 60–65 | 4.0 |
| 70 | 50–55 | 65–70 | 3.3 |
| 40 | 50–55 | 60–65 | 4.3 |
| 50 | 50 | 60–65 | 5.0 |
| 60 | 55–60 | 65–70 | 6.0 |
| 70 | 55–60 | 65–70 | 6.0 |

Having thus disclosed the invention what is claimed is:

1. A method for fabricating a yarn processing jet of the type having at least one yarn duct of substantially rectangular cross-section with at least one fluid entry port thereto, said method comprising superimposing three substantially flat laminae, the inner laminae of which is recessed and discontinuous, the surfaces of said laminae having faces making up said duct being polished to a mirror-like finish prior to said superimposing.

2. The method of claim 1, wherein said fluid entry port is drilled into said inner lamina.

3. The method of claim 1 wherein said inner lamina is cut through to form said fluid entry port.

* * * * *